May 20, 1958 D. D. PEEBLES 2,835,586
DRIED MILK PRODUCT AND METHOD OF MAKING SAME
Filed July 27, 1953 5 Sheets-Sheet 1
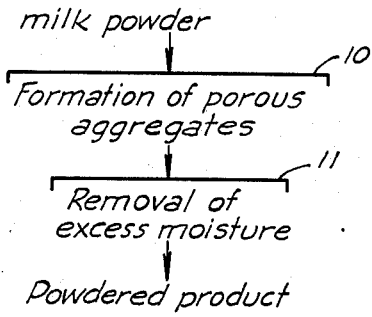
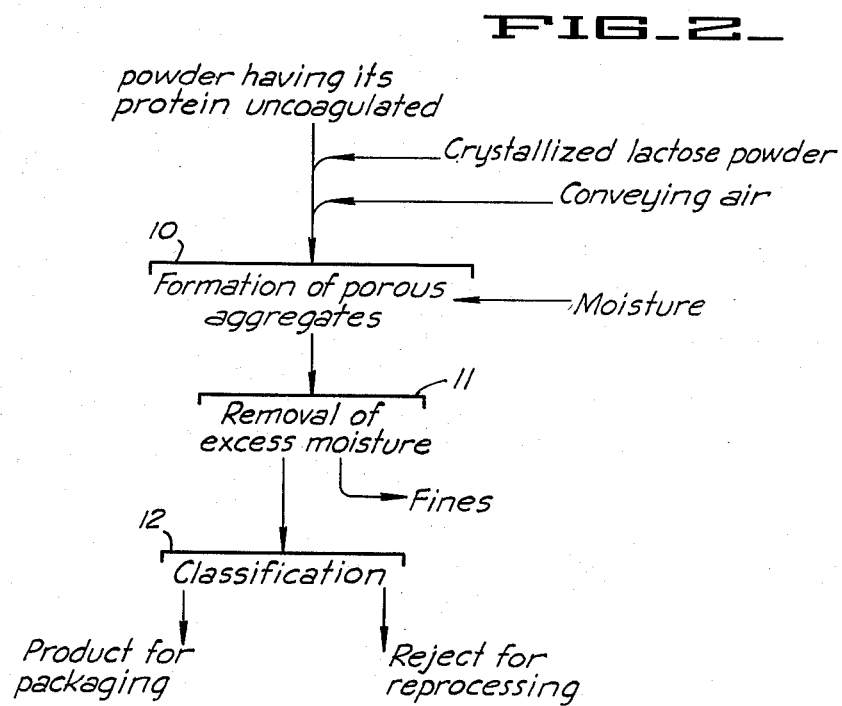
INVENTORS
David D. Peebles
BY
ATTORNEYS

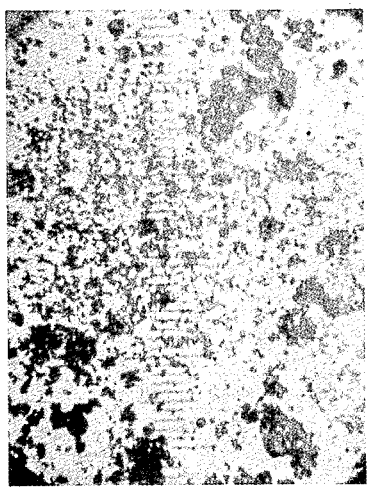
FIG _4_
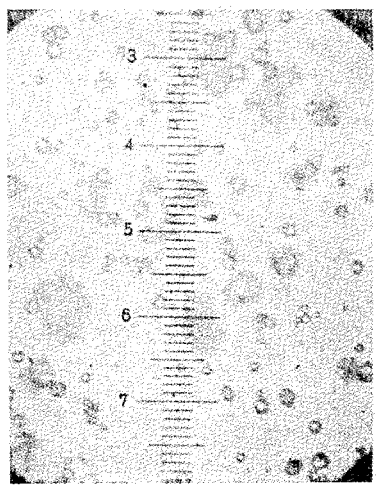
FIG _5_
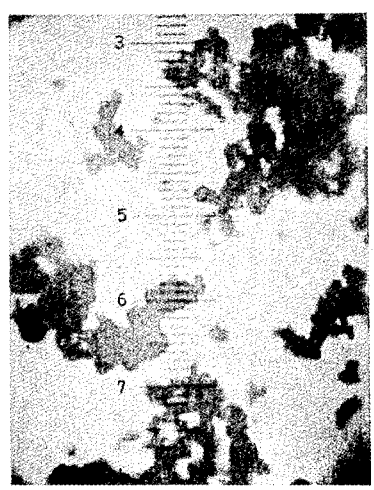
FIG _6_
FIG _7_
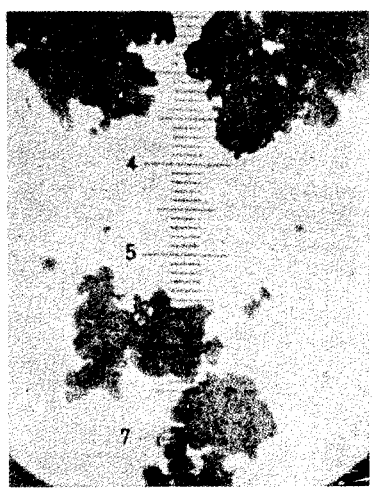
FIG _8_
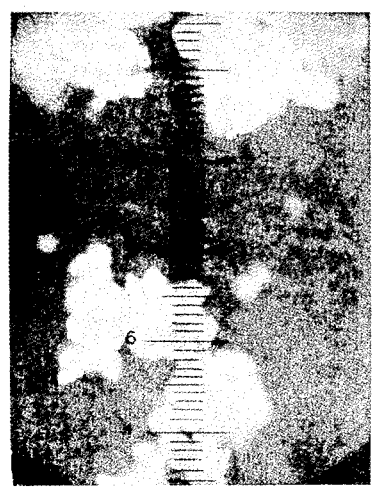
FIG _9_
INVENTORS
David D. Peebles
ATTORNEYS

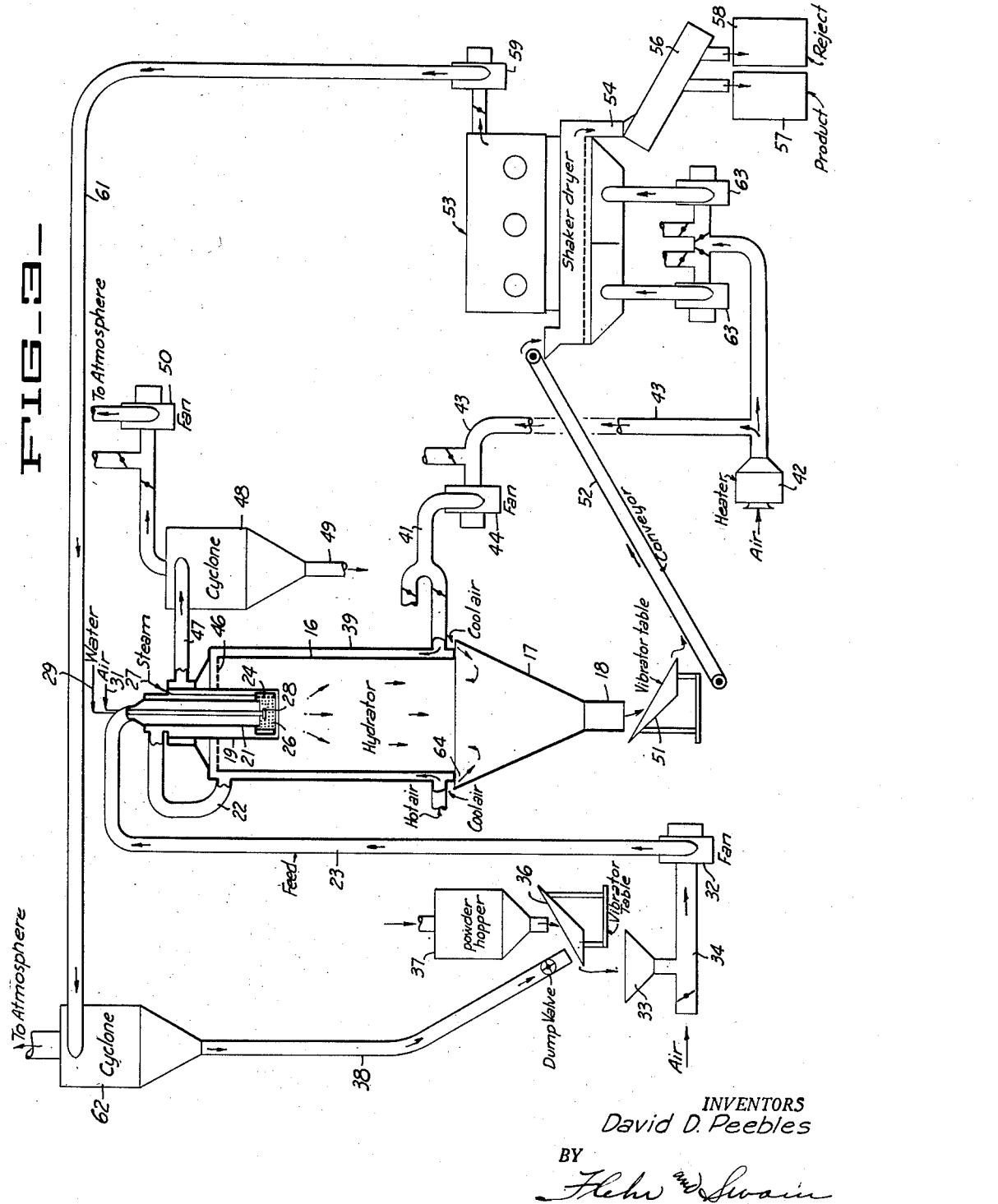

May 20, 1958     D. D. PEEBLES     2,835,586
DRIED MILK PRODUCT AND METHOD OF MAKING SAME
Filed July 27, 1953     5 Sheets-Sheet 4
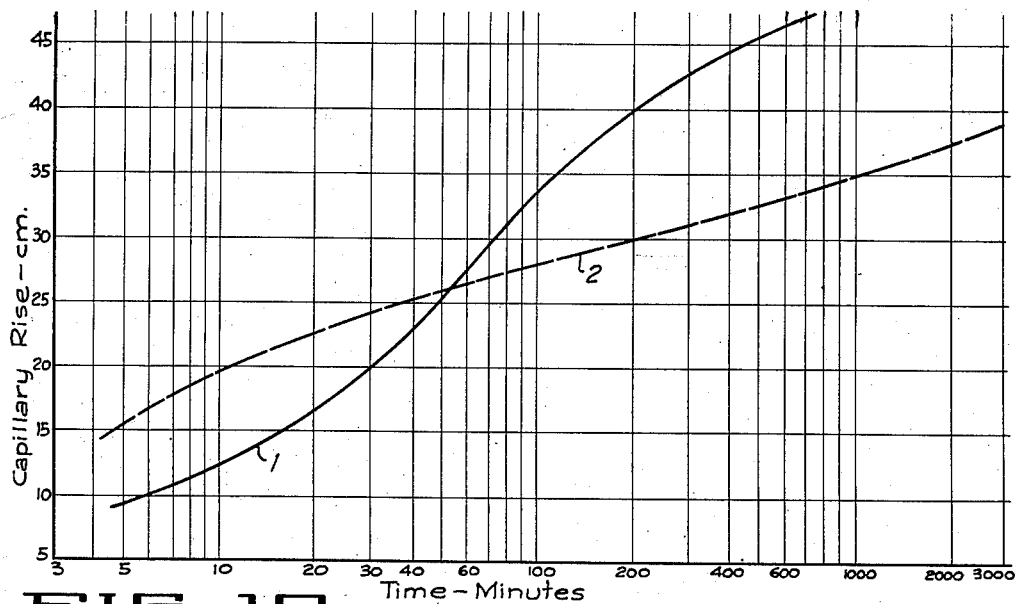
FIG_10_
FIG_11_
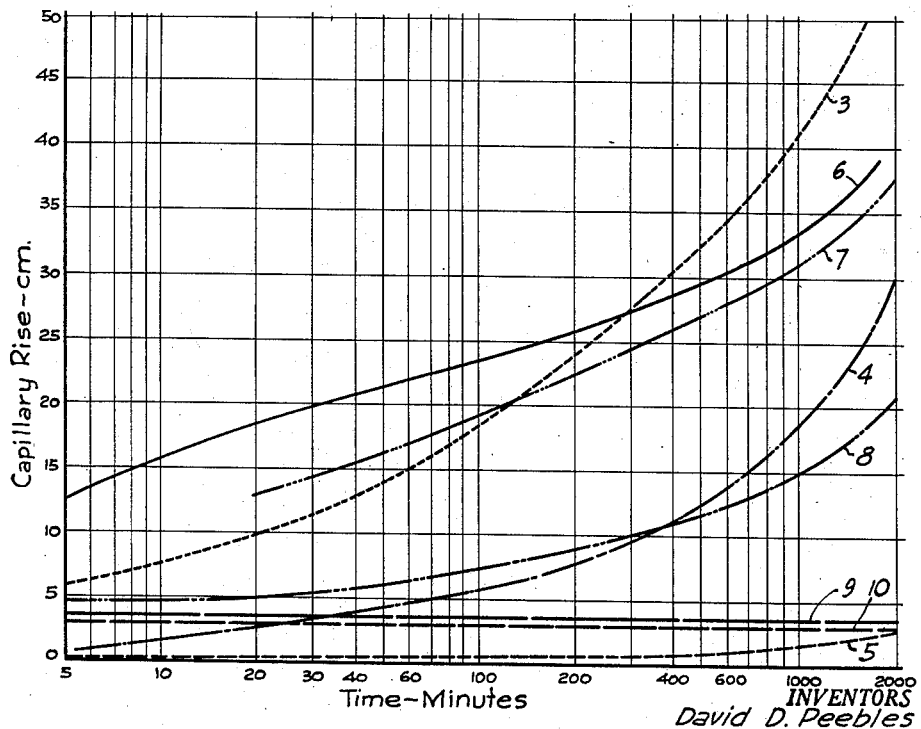
INVENTORS
David D. Peebles
BY
ATTORNEYS May 20, 1958
D. D. PEEBLES
2,835,586
DRIED MILK PRODUCT AND METHOD OF MAKING SAME
Filed July 27, 1953
5 Sheets-Sheet 5
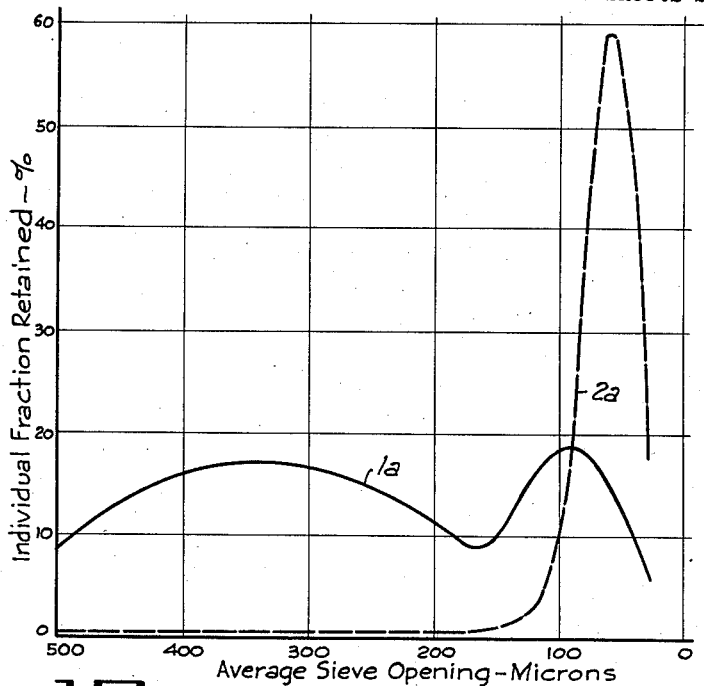
FIG_12_
FIG_13_
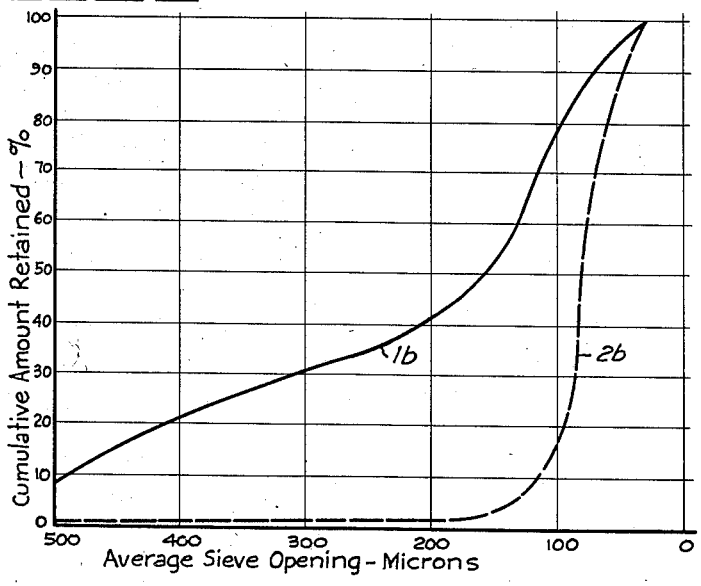
INVENTORS
David D. Peebles
BY
ATTORNEYS United States Patent Office 2,835,586
Patented May 20, 1958

2,835,586

DRIED MILK PRODUCT AND METHOD OF MAKING SAME

David D. Peebles, Davis, Calif., assignor, by mesne assignments, to Instant Milk Company, Los Angeles, Calif., a corporation of Delaware Application July 27, 1953, Serial No. 370,420

16 Claims. (Cl. 99—56)

This invention relates generally to methods for the manufacture of dry powdered products from liquid lacteal material like skim milk.

Commercial skim milk powder is produced by the spray drying of skim milk. It has a total moisture content of about 4.0%, and a particle size such that the bulk of the particles pass an 80 mesh sieve. As will be presently explained in greater detail, when it is attempted to reconstitute such skim milk powder in water the powder resists wetting and tends to form sticky masses or lumps. By extended and vigorous agitation, such as by shaking or mechanical beating, it is possible to reconstitute the skim milk powder in water, but this is time consuming and inconvenient. The same characteristics handicap the use of such spray dried skim milk powder in other products, such as cake or bakery mixes, and in general, beverage and cooking uses.

In general it is an object of the present invention to provide a method which will produce a lacteal powder characterized by its ability to be readily and quickly redispersed in water without vigorous agitation to form a stable reconstituted milk.

Another object of the invention is to provide a method of the above character which is capable of converting ordinary spray dried skim milk powder into a powder which can be quickly redispersed in water, and without addition or removal of any constituents.

Another object of the invention is to provide a method of the above character which can be carried out commercially without serious increase in cost over conventional methods for the production of ordinary skim milk powder.

Another object of the invention is to provide a new powder resulting from the present method, namely a powder comprising porous aggregates which can be readily and completely dispersed in water without vigorous agitation, to form a stable reconstituted milk.

Another object of the invention is to provide a method of the above character which produces a product that, while hygroscopic, does not cake upon the absorption of a reasonable amount of moisture.

A further object of the invention is to provide novel equipment which can be used for carrying out the present method.

Additional objects and features of the invention will appear from the following description in which the preferred embodiment of the invention has been set forth in detail in conjunction with the accompanying drawing.

Referring to the drawing:

Figure 1 is a flow sheet generally illustrating the steps of my method.

Figure 2 is a flow sheet illustrating one procedure for carrying out my method.

Figure 3 is a schematic side elevational view, partly in section showing apparatus incorporating the invention and suitable for carrying out the method.

Figures 4 to 9 inclusive are microphotos serving to illustrate the aggregate character of my product in contrast with the individual particle character of ordinary commercial spray dried skim milk powder.

Figure 10 is a graph illustrating characteristics of my product with respect to capillarity and contrasting it with commercial spray dried skim milk powder.

Figure 11 is a graph illustrating the results of tests on a product made according to the present invention and ordinary commercial spray dried skim milk powder and which serves to illustrate differences in capillarity.

Figures 12 and 13 are graphs illustrating the results of screen analyses of the present product and ordinary commercial spray dried skim milk powder.

In general the present method makes use of skim milk powder such as is produced by conventional spray drying. This powder is subjected to special treatment involving the formation of porous aggregates from its individual particles. Formation of porous aggregates results in a great increase in bulk volume. This moist and puffed material is subjected to drying to remove excess moisture, whereby a final product is obtained which may contain from 3 to 6% (total) moisture. As will be presently explained such material has a number of characteristics which distinguish it from ordinary skim milk powder, and which in particular makes it possible to readily and quickly disperse the material in water to form a stable reconstituted milk, with simple stirring.

Referring to Figure 1 of the drawing, according to the present method I supply a skim milk powder made by conventional drying methods. It is desirable to use a powder having a relatively low solubility index. By solubility index I have reference to the index number obtained by a recognized test for insoluble solids, such as is specified by the American Dry Milk Institute, and which determines the amount of insoluble solids present when a particular powder is reconstituted with water. Thus I can use a powder having a solubility index of the order of 0.10 or less. Conventional methods for the manufacture of skim milk powder involve concentration of edible skim milk by vacuum evaporation, followed by spray drying of the concentrate. In a typical instance the powder may analyze about 36% protein, 52% lactose, 8% ash and 4.0% total moisture. Such powder contains amorphous lactose and is composed mainly of single particles (such as whole or broken spheres) less than 60 microns in size.

In step 10 the skim milk powder is treated in a special manner to effect formation of porous aggregates from the powder particles, and this treatment is accompanied by a great increase in bulk volume, which can be referred to as a puffing of the powder.

In practice, step 10 is carried out by conveying powder in a stream of air, and introducing the same into a chamber where the powder is caused to commingle with continuously introduced warm water vapor and droplets of moisture. The procedure is such that moisture is rapidly and effectively distributed to the surfaces of the powder particles, with the result that momentary surface stickiness results and particles caused to adhere at random, thereby forming porous aggregates of substantial size and random shape. The moisture combined with certain soluble components of the powder provides surface stickiness and the resulting random attachment between the particles.

After removal of the moist and puffed material from the treatment chamber, it is subjected to drying at 11 for the purpose of removing excess free moisture. For example, in a typical instance where the material from the treatment zone may have 15% total moisture, drying serves to reduce the total moisture content to a value of say 3 to 6%.

Figure 2 illustrates a preferred procedure. In the preferred process a stream of conveying air is indicated for carrying a powder which may or may not be mixed with a small amount of crystallized lactose to the treatment zone.

In conjunction with drying at 11, some classification is indicated with removal of fines. In step 12 the powder is shown being submitted to screening to remove undersized material. A portion or all of such fines and undersized material can be returned to step 10 with the skim milk powder and lactose.

The powder and the air used for conveying the powder to the step 10 can be at ordinary room temperatures to, say, from 60 to 80° F. The water vapor and moisture distributed to the particles of powder in the treatment zone can be in the form of saturated steam, together with finely atomized droplets of water. A desirable control over the treatment operation can be had by adjusting the ratio between the atomized water and steam. This is a convenient method of controlling the temperature in the treatment zone. As the particles of powder are commingled with the vapor and atomized water, moisture distributes itself on the surfaces of the powder particles, thus applying to the particles a sufficient amount of water to produce a surface stickiness. The amount of moisture applied in this manner can be such as to provide a total moisture content of from 10 to 20%, a more restricted preferred range being from 14 to 16%, and about 15% being optimum. The preferred temperature level of the treatment zone is of the order of 80 to 120° F.

Substantially simultaneously with providing a surface stickiness for the individual powder products, the particles are commingled in such a manner that contacts between particles causes them to adhere together in the form of porous aggregates of random shape. The aggregates are made up of a number of powder particles and vary in size.

The total time period for step 10 may range from 5 to 60 seconds for the type of equipment to be presently explained. In addition to forming porous aggregates during this interval, some of the more readily soluble components of the powder go into solution to form the sticky coating.

As the porous aggregates are formed, they are soft and will not stand mechanical handling. These aggregates must be permitted to rest without handling as, for example, on a moving belt, until the structures have become firm. This rest period may vary depending upon temperature and moisture from a second to several minutes. After the resting period the material is definitely less sticky, it is relatively free-flowing, and the aggregates have sufficient strength for handling and drying without serious break-up or crushing.

All of the treatment steps of Figure 2 are preferably carried out under such temperature and time conditions as to avoid any substantial increase in the amount of insoluble material in the product. In this manner I avoid any substantial increase in the solubility index. Assuming an average temperature in the treatment zone of the order of 100° F., and a total moisture content of the product of about 15%, it has been found that no noticeable increase in the solubility index occurs over a total holding time approaching 30 minutes.

While various procedures can be used for removing excess moisture in operation 11 which is practiced after the rest period, it is desirable to avoid such mechanical handling as may cause serious grinding or excessive crushing of the aggregates. Likewise, it is desirable to avoid any substantial increase in the amount of insoluble material in the product, such as coagulated protein. Assuming that the product is dried in contact with air, the temperature of the air can be of the order of from 200 to 300° F., from 230 to 250° F. being deemed optimum. The temperature levels and time period of drying can vary inversely but must be controlled to avoid the creation of undesirable amounts of insoluble material such as coagulated protein and the creation of foreign flavors due to overheating. The final moisture content of the product can be of the order of from 3 to 6% (total).

A desirable drying procedure, among several, is to convey the moist material to a screen provided with small perforations, and which is vibrated to cause the material to progress from the feed to the discharge end of the screen, and to apply vertical motion to maintain the powder as a loose working layer. In conjunction with the vibrating action, a warm drying air is delivered upwardly through the screen to pass upwardly through the layer of powder. The number and size of the openings in the screen are so chosen in relation to the rate of air delivery therethrough that the product moving along the screen is "fluffed" to form a layer several times the thickness it would normally have if at rest. By this technique the product is caused to progress along the screen and is at least partially supported by the cushion of air intermingled therewith. This provides drying action without rough mechanical handling which might break up the product aggregates. A small amount of relatively fine sized powder is carried away from the drier in the drying air stream. Removal of such fine material is indicated in Figure 2 and provides a material which can be returned to the process.

Figure 3 shows apparatus suitable for carrying out the procedure outlined in Figure 2. The chamber 16 is disposed on a vertical axis, and is circular in horizontal section. The lower end of this chamber extends into the collecting cone 17, which has a lower open discharge conduit 18.

A pair of concentric conduits or casings 19 and 21 extend downwardly through the top wall of the chamber, and the upper end of the conduit 19 connects with the conduit 22. The upper end of conduit 21 connects with the feed conduit 23, by way of which air and powder to be treated are introduced into the chamber. The lower open end of the conduit 19 terminates at a level somewhat below the lower open end of conduit 21. In a region immediately below the conduit 21, there is an annular member 24, the inner wall of which is provided with a plurality of small perforations 26. Member 24 is connected to the steam supply pipe 27 whereby wet steam discharging from the perforations 26 forms a hot moist atmosphere (i. e. vapor) which envelops powder being delivered downwardly from the conduit 21. Within the annular member 24, and likewise a short distance below the lower end of the conduit 21, there is an atomizing nozzle 28. This nozzle is connected to the water and air supply pipes 29 and 31. By the use of air under pressure a fine water mist can be delivered from nozzle 28 to intermingle with the steam or water vapor.

The means illustrated for introducing powder by way of conduit 23, includes the blower 32 and the feed funnel or hopper 33, by means of which material can be introduced into the intake conduit 34 of the blower. A vibrating feeder table 36 serves to supply powder at a regulated rate to the hopper 33. A storage hopper 37 is shown for supplying powder to the feeder 36. Returned fines is also supplied to the table 36 through the conduit 38.

The side walls of the chamber 16 are preferably heated to a temperature of above the dew point, in order to avoid any condensation of moisture upon the inner surfaces of the same. Thus, a jacket 39 is shown about the side walls of the chamber, and the lower end of this jacket is connected to the hot air supply conduit 41. Hot air is supplied to conduit 41 from a suitable source, such as the air heater 42, conduit 43, and blower 44. In a typical instance the temperature of this air may be of the order of from 90 to 140° F. The jacket space communicates with the upper end of the chamber 16, and also with the conduit 22. The upper end of the chamber above the transverse bars 46 communicates with the exhaust conduit 47. Air delivered through conduit 22 passes downwardly through the conduit 19, to envelop the powder after the powder has been moistened. Air removed through conduit 47 passes through cyclone 48, whereby any fine powder carried by this air is removed by way of conduit 49. The cyclone connects with the fan 50 which discharges to atmosphere.

The conduit 18 at the lower end of the cone 17 delivers the aggregated material upon the vibrating table feeder 51, which delivers it to suitable conveying means, such as the belt conveyor 52. If desired, conduit 18 may deliver the aggregated material directly onto belt 52. This conveyor delivers the material to the drier 53 of the shaker screen type. The discharge conduit 54 from this drier delivers the material to the screen 56 which can break the larger aggregates and separate the material into two fractions 57 and 58. The fraction 57 is the desired product, and is of sufficient size to remain upon the screen. The reject material 58 consists of fine material which passes through the screen. The screen in a typical instance may be about 80 mesh. As an alternative, the reject material 58 may be separated from the desired product, fraction 57, by means of a gentle upward rising current of air which will float out the fines without disturbing the aggregates.

Air is exhausted from the shaker drier 53 through the blower 59 and conduit 61. This conduit discharges into the cone 62, and the fine powder separated in this cone is returned by way of conduit 38, to the shaker table 36. Thus material carried with the drying air from the drier 53 is returned to the process. Hot drying air is supplied to the drier 53 from the heater 42 by way of blowers 63.

The drier 53 is of the type previously described making use of a vibrating screen upon which the aggregates are delivered. The screen preferably consists of a plate having a plurality of small holes formed in the same and which is vibrated in such a manner as to apply vertical velocity components to the aggregates, as well as to move the aggregates toward the discharge conduit 54. The drying air is introduced into a chamber formed below the screen whereby the hot air jets upwardly through the openings to pass through the working layer of aggregates upon the screen. The bulk of the powder is of such particle size that it is not carried through the fan 59 by the air currents. Relatively fine material, however, is carried with the air stream and ultimately delivered by conduit 38 to the table feeder 36.

Operation of the apparatus described above is as follows: Normally sufficient stream or water vapor together with atomized water issues from the openings 26 and nozzle 28 to provide an atmosphere of water vapor and water droplets in a localized zone immediately below the open end of conduit 21. As the powder is delivered from the lower end of conduit 21 together with the conveying air, which may be at room temperature, water collects upon the surfaces of the particles. The balance between the rate of powder feed and the amount of moisture supplied and the balance between moisture supplied by the nozzle 28 and steam or water vapor through openings 26 are so regulated that the material issuing from conduit 18 has a total moisture content of the order of 10 to 20%, about 15% being considered optimum. Further, the material issuing from conduit 18 has an apparent volume several times that of the stream of material being fed from vibrating table 36. The balances between rate of powder feed, rate of water feed, and rate of steam feed, are so regulated as to produce the maximum increase in bulk of the material as it issues from conduit 18. If too much water is being introduced into the process, it becomes readily apparent by a decrease in the apparent bulk of the material as it issues from conduit 18.

As previously explained the moisture serves to make the surfaces of the particles sticky and as the particles are commingled, which results in mutual contacts, they adhere together with random attachments, to form porous aggregates of considerable size.

After clearing the localized zone at the lower end of conduit 19 where moisture is applied, the material enters the main part of the chamber 16, where it is enveloped in the warm air being continuously introduced into the chamber by way of conduit 19. This warm air serves to sustain the temperature of the powder.

The moist material falls downwardly through the chamber 16, and ultimately reaches the cone 17. As indicated by the arrows, as it reaches the upper end of the cone it is commingled with cooler atmospheric air, entering by way of the space 64 between the upper end of the cone and the lower end of the chamber 16. Under proper operating conditions no substantial amount of the material clings to the walls of either the chamber 16 or the cone 17. In other words, the material continues to fall downwardly in free flight until it is delivered by the conduit 18, to the table feeder 51. Although the material as initially delivered from conduit 18 may in a typical instance be at a temperature of the order of 100° F., its temperature gradually falls after being delivered to the table 51, and as it is being moved by the conveyor 52. In the shaker drier 53 excess moisture is removed in the manner previously described, to produce the desired final product.

Skim milk powder is fed to the apparatus by way of the table feeder 36, together with crystallized lactose powder, or fines returned by way of conduit 38. Alternately, skim milk powder previously blended with lactose powder, fines from the shaker drier, or reject material from the screen 56, or any of these, may be fed to the apparatus by way of the table feeder 36. Powder from any suitable source can be supplied to the hopper 37, and the discharge from this hopper arranged whereby table 36 feeds at a substantially even rate to the hopper 33. As previously indicated, it is desirable to maintain a constant feed of powder to facilitate regulation of the steam and atomized water. In general, introduction of too much moisture results in too high a total moisture content for the material being delivered to the table feeder 51 whereby the material tends to form a doughy mass rather than a fluffy stream of aggregates and cannot be dried to form a satisfactory product. An insufficient amount of moisture also causes the material delivered at 18 to be unsatisfactory. Application of too much steam in proportion to the atomized water tends to cause the powder to be heated to an excessive temperature, thus tending to cause some coagulation of protein.

In the shaker drier 53, the power is continuously agitated while excess moisture is being removed, but such agitation is insufficient to cause any serious amount of crushing or grinding of the powder. It suffices to avoid formation of lumps, whereby the finished product is free flowing and in proper condition for bagging or packaging.

The product produced by the method and apparatus described above has unique and desirable properties. Its particles are in the form of aggregates formed by a cementing together of the original powder particles, and the aggregates are relatively porous. In general the size of the aggregates may vary, although more than about 50% (by weight) (80% in a typical instance) remains on a 200 mesh screen and are of a size in excess of 74 microns. In contrast, 80% of the particles in conventional skim milk powder pass through a 200 mesh screen. The aggregates have sufficient strength for handling and packaging without serious crushing. The specific gravity of the finished product is of the order of from .27 to .39 (preferably .32), as distinguished from about .6 for ordinary skim milk powder. The solubility index is substantially the same as that of the original feed powder and the extent of hydration of the lactose is from 30% to 62%.

The desirable properties of our product in contrast with conventional skim milk powder can be demonstrated as follows: When a spoonful of conventional spray dried skim milk powder is dropped into a tumbler containing a quantity of water, the powder floats upon the surface of the water and if the contents of the tumbler are permitted to stand without stirring, the powder forms a sticky mass. When this test is applied to the material made by the present method, the bulk of the material floats upon the surface of the water for only a short interval and immediately progressive sinking occurs. As the material sinks it disintegrates and disperses. If one should attempt to stir the contents of the tumbler after adding the conventional skim milk powder, the powder takes the form of sticky lumps and masses and relatively vigorous agitation or beating is required over a substantial period of time in order to break up the lumps and effect complete dispersion. With the product produced by the present method, simple stirring as by means of a spoon, or moderate shaking, serves to rapidly disintegrate and completely disperse the material to form a stable reconstituted milk without formation of sticky lumps.

Microphotos of Figures 4 to 9 inclusive serve to illustrate the character of our product in contrast with the individual particles of ordinary dry skim milk. Figures 4 and 5 are microphotos of ordinary spray dried skim milk powder, at 65 and 270×magnifications, respectively, taken by normal light. It is apparent from these microphotos that the particles of the powder are inherently separate and detached. The appearance of clusters in these microphotos is due to the close positioning of particles rather than direct attachment.

Figures 6 and 7 are microphotos of our product at 65×magnification, with normal and polarized light respectively. Figures 8 and 9 are microphotos of the same product at 270×magnification, with normal and polarized light respectively. Contrasting Figures 6 to 9 inclusive with Figures 4 and 5 reveals the aggregative character of my product, in which the particles are attached together in a random fashion to form aggregates which vary widely as to shape.

When a powdered material is deposited as a clump in water, or caused to float upon the surface of the water, gravitational forces tend to cause the water to penetrate through the mass and capillary attraction tends to cause the water to penetrate from all wetted sides. The size of the openings or channels between the particles within the clump provide a certain resistance to the hydrostatic forces and partially determine the nature of the capillary forces. In general as the size of the openings or channels decreases, there is increased resistance to the hydrostatic force, but also increased capillary forces.

Tests which I have made demonstrate the fact that with normal spray dried skim milk powder, the openings or channels in such a clump of the powder are relatively small, and capillary forces are relatively large. On the contrary, for the present product resistance to hydrostatic force is relatively low, because of the large size of the openings or channels, and capillary forces are relatively low.

As a laboratory method of measuring capillarity, I used Pyrex glass tubes 115 cm. high and 10 mm. internal diameter. These tubes were plugged lightly at one end with 2 mm. of absorbent cotton. A sample of the material under observation was placed in a tube, and the bottom of the tube tapped until the powder packed to a height (.77 cm.) equal to 90% of its untapped height. An equal weight of material made in accordance with the present process was introduced into a tube, and after tapping the height of the column was 95.0 cm. The tubes were held in vertical position with the lower ends inserted through corks, which in turn were inserted into the upper ends of 250 milliliter Erlenmeyer flasks. The corks were grooved to allow introduction of air. The flasks were filled with about 175 milliliters of liquid prior to inserting the tubes and then the tubes were immersed so that the bottom of each tube was one centimeter above the bottom of the flask. Capillarity was measured in terms of height of rise of liquid within a tube per second. The tests were carried out making use of several different types of liquid, as follows: benzene, Formula 30 (95% alcohol—86.4% ethanol, 8.6% methanol plus 5% water), 80, 65, 50 and 35% of Formula 30 (by weight) and distilled water. The average results obtained are graphed in Figures 10 and 11. Curve 1 (Figure 10) represents the spray dried skim milk powder, and curve 2 the present product. Note that for benzene the rise due to capillarity was much faster for my product than for the skim milk powder, and leveled off after about 20 minutes to give a log function with time.

Curves 3, 4 and 5 (Figure 11) representing the skim milk powder samples, show that as the liquid used increased in water content, the rise over the initial period of the test decreased accordingly (the 50 and 35% liquids could not be graphed because of the negligible rise of liquid over the time period of observation). This is attributed to a self-blocking action due to a swelling of the particles in the localized wetted zone with the result that the capillary openings were substantially closed to block further penetration. Curves 6, 7, 8, 9 and 10 show penetration for samples of the present product, utilizing the 95, 80, 65, 50 and 35% alcohol liquids. Note that a moderate amount of rise occurred immediately and that thereafter the liquid remained at about constant height.

The capillarity test described above, and graphed in Figures 10 and 11 demonstrates the fact that the present product will take up water by capillarity, without serious self-blocking due to swelling of the particles or for other reasons, and that the passages or channels through a mass of the product do not provide the capillary force comparable to the skim milk powder. From these tests it can be concluded that capillarity causes water to rapidly penetrate a mass of the present product, and that penetration is not blocked by particle swelling. Although the force of capillarity is greater for skim milk powder, probably because of the relatively smaller size of the spaces between particles, self-blocking or damming action due to swelling of the particles or other causes with consequent reduction in the size of the openings between particles prevents any rapid penetration of water.

Previous reference has been made to the porous nature of the aggregate masses making up the product. A bulk mass of the aggregates is likewise porous to penetration of water, due not only to the porous nature of the aggregates themselves, but also bridging between the aggregates which prevents a closely packed relationship.

The bottom end of a Pyrex glass tube 30 cm. long and 8 mm. internal diameter was plugged with about one mm. of absorbent cotton and the sample of the product under test inserted through the top end of the tube until it filled a height of 17.0 cm. The tube was then taped to cause the sample to be compacted to a height of 15.0 cm. The cotton plug was then removed, and then 6 milliliters of a liquid was pipetted on top of the sample and the length of time required for the solvent to penetrate 10.0 cm. was measured with a stop watch. Ths test was carried out for samples of spray dried skim milk powder, and samples of the subject product. The liquids used were the same as used for the above capillarity tests, although carbon tetrachloride was used as a non-aqueous medium. The average time for several samples of skim milk powder using carbon tetrachloride was about 220 seconds, and for run samples of the present product, about 40 seconds. For 85 and 80% alcohol mediums the time was about 750 and 800 seconds. Tests clearly demonstrate the fact that a mass of my material is relatively porous, and the porosity is such that a liquid may readily penetrate the same without damming or self-blocking.

Another characteristic of my product which has been demonstrated by laboratory tests is its relatively high wettability. The laboratory test used for this purpose employed a 16 mm. test tube filled to within 1 cm. of the top with distilled water at room temperature. A 0.05 gram of the sample being tested was dropped on the surface of the water, and the time for the powder to wet completely was measured. This test was carried on a number of commercial spray dried skim milk samples, and the results compared with samples of the present product. The commercial spray dried skim milk samples required from 210 to 360 seconds for complete wetting, whereas samples of the present product required only from 1 to 5 seconds for complete wetting. The remarkable wettability thus demonstrated is attributed in part to the aggregate character of the present product as distinguished from the relatively small individual particles of commercial spray dried skim milk powder.

The size of the aggregates making up the product appears to be an important factor in securing the desired characteristics. When my product is ground so that it passes through a 200 mesh sieve, it does not have the characteristics desired, having particular reference to permeability and wettability, and its ability to quickly and readily disperse in water without vigorous agitation. Thus I believe it important for the bulk of the material to be of such size that it will remain on a 200 mesh screen. Actually laboratory tests made upon samples of my product have shown that from about 80 to 86% of the product is of such size that it remains upon a 200 mesh sieve. Particles of such size are perceptible to the naked eye, whereas the particles of conventional skim milk powder are not.

I have made laboratory sieve analyses upon typical products made in accordance with the present method, and typical samples of commercial spray dried skim milk powder. In Figure 12, curve 1a represents the results of sieve analyses of the present product while curve 2a represents commercial spray dried skim milk powder. In Figure 13, curve 1b likewise likewise represents the present product and curve 2b the commercial spray dried powder. In general the curves of Figures 12 and 13 show the particle size distribution in the present product, and contrast this with commercial spray dried skim milk powder. Figure 12 is in terms of percent of individual fractions retained, while Figure 13 is plotted against the percent of accumulated amount retained on the sieve.

It will be evident that the present method can be used to greatly enhance the commercial uses of skim milk powder. For ordinary domestic use to form reconstituted skim milk, the product is greatly superior to conventional skim milk powder because it does not require vigorous or prolonged agitation to make the desired stable dispersion. Due to its free flowing characteristics it is easy to remove from a container and can be poured from a spout without plugging or dusting. Conventional skim milk powder, on the contrary, cannot be poured from an ordinary spout such as that used on the conventional retail salt package.

Another advantage of the present product is that when exposed to moist air it will not cake, whereas conventional skim milk powder cakes hard under this condition. This is because the lactose content is largely hydrated during the process, whereby it is in crystalline form in the finished product.

When added to pastry, bakery or other mixes which contain flour, sugar, and other ingredients, the ready dispersibility of my product does not hinder or impair the ease with which the mixture can be incorporated with water. On the contrary, with the present product such mixes can be made in such a manner that they can be homogeneously mixed with water in a minimum amount of time without excessive mechanical mixing or beating and without the formation of sticky lumps or masses.

Because of its excellent flavor and palatability, reconstituted milk made by use of the product appears to be substantially identical in color, palatability, and flavor to the original liquid milk.

Although reference has been made to the use of dried skim milk powder having a solubility index of the order of 0.1 or less, my process can be used to advantage with other grades of skim milk powder without causing any appreciable increase in the solubility index.

While in the above description reference has been made to the manufacture of a dry skim milk product to which the invention is particularly applicable, it is to be understood that the method may be applied to similar lacteal materials.

I claim:

1. A method for the manufacture of a dried food product which is readily dispersible in water to form a stable reconstituted milk product, comprising continuously moistening dried milk particles in dispersed condition, causing said moistened particles while dispersed in a treatment zone to contact and permanently adhere together in the form of light, porous, random aggregates of a size substantially greater than the size of the particles, said aggregates leaving said zone in dispersed condition having a total moisture content of from 10 to 20%, and then removing excess moisture from the aggregates to provide a final product having a moisture content of the order of less than 6 percent without any substantial amount of crushing of the aggregates, the final product being a free-flowing, granular material.

2. A method as in claim 1 in which the temperature in said treatment zone is of the order of 80 to 120° F.

3. A method as in claim 1 in which the excess moisture is removed by passing drying air through a mass of the aggregates to effect progressive drying.

4. A method as in claim 1 in which the aggregates are continuously collected and held in a quiescent uncompressed mass prior to the last named step of removing excess moisture for a period of time such that the aggregates are rendered firm and substantially less sticky.

5. A method for the manufacture of a dried food product which is readily dispersible in water to form a reconstituted milk, comprising causing a stream of milk powder containing amorphous lactose and milk protein, in a dispersed condition in a treatment zone, to be moistened by adding thereto an amount of moisture sufficient to provide the powder with a total moisture content of from 10 to 20 percent, the added moisture serving to make the dispersed particles sticky, causing the sticky particles while dispersed in said treatment zone to contact and adhere together in the form of light, porous, random aggregates leaving said zone in dispersed condition and of a size substantially greater than the particle size of the original powder, and removing excess moisture from the aggregates to provide a final product having a moisture content of the order of less than 6 percent without substantial coagulation of the protein or any substantial amount of crushing of the aggregates, the final product being a free-flowing granular material having a density substantially less than that of the original milk powder.

6. A method as in claim 5 in which powdered lactose in crystalline form is intermixed with the milk powder being supplied to the method.

7. A method as in claim 5 in which the temperature of the zone in which the moisture is added and formation of aggregates takes place is of the order of 80 to 120° F.

8. A method as in claim 5 in which the milk powder is spray dried skim milk.

9. The method of claim 5 in which the porous, random aggregates are continuously collected and held in a quiescent uncompressed mass prior to the last named step of removing excess moisture for a period of time such that the aggregates are rendered firm and substantially less sticky.

10. A method for the manufacture of a dried food product which is readily dispersible in water to form a stable reconstituted milk product, comprising continuously moistening dried milk particles in dispersed condition, continuously causing said moistened particles while dispersed in a treatment zone to contact and adhere together in the form of light, porous, random aggregates leaving said zone in dispersed condition and of a size substantially greater than the size of said particles, collecting and removing the aggregates continuously in a quiescent uncompressed mass for a period of time such that the aggregates are rendered firm and substantially less sticky, and removing excess moisture from the aggregates to provide a final product having a moisture content of the order of less than 6 percent without any substantial amount of crushing of the aggregates, the final product being a free-flowing granular material.

11. A method for the manufacture of a dry milk product, comprising causing a stream of dry skim milk powder in a dispersed condition and containing milk protein and amorphous lactose to be delivered to a treatment zone, supplying water vapor and atomized moisture to said zone whereby moisture is applied to the particles and whereby the surfaces of the particles are made sticky, causing random attachments of the particles while in such sticky condition and while the powder is progressing through said zone, thereby forming porous aggregates, the total moisture content of the powder leaving said zone being of the order of from 14 to 16%, continuously collecting the aggregates passing from said zone and conveying the same in a quiescent uncompressed mass toward a subsequent drying operation, the aggregates during such conveying being held for a period of time such that they are rendered firm and substantially less sticky, and removing excess moisture in said subsequent drying operation without substantial crushing of the aggregates.

12. A method as in claim 11 in which the material after said final drying operation is subjected to sizing to form at least two sized fractions, the one containing the aggregates of larger size and the other containing smaller sized material, the smaller sized fraction being mixed with the dry skim milk powder being fed to the method.

13. A method for the manufacture of a dry milk product, comprising causing a stream of dry skim milk powder in a dispersed condition and containing milk protein and amorphous lactose to be delivered to a treatment zone, continuously supplying water vapor and atomized moisture to said zone, whereby moisture is applied to the particles and whereby the surfaces of the particles are made sticky, causing random attachments of the particles while in such sticky condition and while the powder is progressing through said zone, thereby forming moist porous aggregates, the total moisture content of the material leaving said zone in dispersed condition being of the order of 10 to 20%, continuously collecting the aggregates passing from said zone and conveying the same in a quiescent uncompressed mass toward a drying operation, the aggregates during such conveying being held for a period of time such that they are rendered firm and substantially less sticky, and removing excess moisture in said drying operation without substantial crushing of the aggregates.

14. A dry food product comprising porous aggregates, the aggregates consisting of smaller particles of milk powder firmly adhered together in random fashion to form a free-flowing, divided material, the milk solids present forming a stable milk when dispersed in water, the product being further characterized by high wettability and by its ability to quickly disperse in water by simple stirring to form a stable, reconstituted milk product, the major portion of the aggregates having a size greater than about 74 microns.

15. A dry milk product comprising porous aggregates, the aggregates consisting of smaller particles of dry milk powder firmly adhered together in random fashion to form a free-flowing, divided material, the major portion of the aggregates having a size greater than about 74 microns, the milk solids present having a solubility index substantially of the order of about 0.1, the product having a specific gravity ranging from 0.27 to 0.39, a substantial portion of the lactose content of the product being in crystalline form, the product being free-flowing and non-hygroscopic and characterized by high wettability and its ability to quickly disperse in water by simple stirring to form a stable, reconstituted milk product.

16. A dry food product as in claim 14 having a specific gravity ranging from 0.27 to 0.39.

References Cited in the file of this patent

UNITED STATES PATENTS

| | | |
|---|---|---|
| 1,394,035 | MacLachlan | Oct. 18, 1921 |
| 1,398,735 | MacLachan | Nov. 29, 1921 |
| 1,928,135 | Peebles et al. | Sept. 26, 1933 |
| 2,016,592 | Chuck | Oct. 8, 1935 |
| 2,044,194 | Visser | June 16, 1936 |
| 2,174,734 | Chuck | Oct. 3, 1939 |
| 2,627,463 | Meade | Feb. 3, 1953 |

OTHER REFERENCES

"Condensed Milk and Milk Powder," 6th ed., published by the author, 1946, La Grange, Illinois, by O. F. Hunziker, pages 431, 432.